UNITED STATES PATENT OFFICE.

ALBERT R. MAYER, OF NEW YORK, N. Y., ASSIGNOR TO EDWARD G. SOLTMANN, OF NEW YORK, N. Y.

COMPOSITION OF MATTER FOR THE REMOVAL OF INK.

No. 878,817.   Specification of Letters Patent.   Patented Feb. 11, 1908.

Application filed November 15, 1907. Serial No. 402,228.

*To all whom it may concern:*

Be it known that I, ALBERT R. MAYER, a naturalized citizen of the United States, and a resident of New York, in the county of New York and State of New York, have invented certain new and useful Improvements in the Composition of Matter for the Removal of Ink, of which the following is a specification.

My invention relates to a new and useful composition of matter to be used particularly for the removal of ink and other writing fluids from tracing cloth and similar material.

My composition consists of a mixture of the following ingredients, combined in substantially the proportions stated, viz:

Sweet spirit of niter (U. S. P.) 3 parts
Peroxid of hydrogen (U. S. P.) 1 part.

The above composition may be diluted with one-third of its volume of ethyl alcohol, if it be not required to be kept for a long time, the decomposition being hastened by the addition of the alcohol and retarded by keeping the solution in a dark glass bottle or a bottle protected against light. I prefer to add some perfuming ingredient such as bergamot to alter the odor. I also prefer to add a coloring material resembling somewhat the tint of the cloth upon which the solution is to be applied, and for this purpose I have found methyl blue satisfactory for solutions adapted to be applied to the usual blue-tinted tracing cloth. Should the solution have any tendency to stain the cloth this said solution being of the color of said cloth, such stain will not be particularly noticeable.

In mixing the ingredients, the perfume and coloring material (if desired), are first added to the peroxid of hydrogen in quantity sufficient to give the desired odor and tint. This mixture is then mixed with the sweet spirit of niter, whereupon the solution is ready for use.

The proportion of the various ingredients as set forth above may, of course, be varied within reasonable limits without departing from my invention.

In using the above described composition for removing ink and the like from tracing cloth and similar material, the solution is applied to the same by means of a brush, sponge or cloth moistened therewith. After a few moments this may then be wiped up and removed with a piece of blotting paper, or by wiping with a piece of soft cloth.

In removing a portion only of a line, or some other specific part of drawings, a number of pieces of blotting paper with a glazed upper surface, or other pieces of paper, erasing shields and the like, are placed about the part to be removed so as to isolate it from the rest; and the ink then wiped out as explained. The ink is thus thoroughly removed from the cloth, without causing any injury to the said cloth, particularly if applied to the dull or unglazed side of the cloth; and leaves the surface of the same so that the ink can be again applied without danger of spreading.

I claim:—

1. The herein described composition of matter, consisting of a mixture of sweet spirit of niter and peroxid of hydrogen, substantially as described and for the purpose specified.

2. The herein described composition of matter for removing ink from tracing cloth and the like, consisting of a mixture of sweet spirit of niter—three parts, and hydrogen peroxid—one part, substantially as described.

3. The herein described composition of matter for removing ink from tracing cloth and the like, consisting of a mixture of sweet spirit of niter, hydrogen peroxid, and a coloring material of substantially the color of said tracing cloth.

4. The herein described composition of matter for removing ink from tracing cloth, consisting of a mixture of sweet spirit of niter, hydrogen peroxid, and methyl blue, substantially as described.

Signed at New York, in the county of New York and State of New York this 13th day of November A. D. 1907.

ALBERT R. MAYER.

Witnesses:
FREDK. F. SCHUETZ,
SALLY O. YUDIZHY.